(12) United States Patent
Karanje et al.

(10) Patent No.: US 12,340,777 B2
(45) Date of Patent: Jun. 24, 2025

(54) DYNAMIC DISPLAY SUBSYSTEM RECONFIGURING FOR POWER SAVINGS

(71) Applicant: Intel Corporation, Santa Clara, CA (US)

(72) Inventors: Kedar Karanje, Karnataka (IN); Satish Koli, Bangalore (IN); Sitanshu Nanavati, Bangalore (IN); Bhavesh Kumar Arya, Bangalore (IN); Shaik Sameeruddin, Vijayawada (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/621,386

(22) Filed: Mar. 29, 2024

(65) Prior Publication Data

US 2024/0242691 A1    Jul. 18, 2024

(51) Int. Cl.
  *G09G 5/00* (2006.01)
(52) U.S. Cl.
  CPC ....... *G09G 5/006* (2013.01); *G09G 2330/023* (2013.01); *G09G 2340/0435* (2013.01)

(58) Field of Classification Search
  CPC ............. G09G 5/006; G09G 2330/023; G09G 2340/0435
  See application file for complete search history.

(56) References Cited

U.S. PATENT DOCUMENTS

| | | | |
|---|---|---|---|
| 2008/0146286 A1* | 6/2008 | Byun | H04M 1/72403 455/566 |
| 2022/0068242 A1 | 3/2022 | Maloney et al. | |
| 2023/0409099 A1 | 12/2023 | Chauhan et al. | |

* cited by examiner

*Primary Examiner* — Abbas I Abdulselam
(74) *Attorney, Agent, or Firm* — Banner & Witcoff Ltd.

(57) ABSTRACT

Systems, apparatuses and methods may provide for technology that identifies a parameter of an internal display, populates a lookup table with the parameter and alternative configuration data if the parameter is related to power consumption, detects a trigger condition during operation of the computing system, and reconfigures the internal display from a first state to a second state in response to the trigger condition based on the lookup table and the alternative configuration data, wherein the internal display and/or a system on chip (SoC) associated with the internal display consumes a reduced amount of power in the second state relative to the first state.

20 Claims, 5 Drawing Sheets

DYNAMIC DISPLAY SUBSYSTEM RECONFIGURING FOR POWER SAVINGS

BACKGROUND

Consumer electronic devices such as notebook computers and smart phones typically have inbuilt (e.g., internal, embedded, native) displays with settings that are predominately static. The underlying features/functionality associated with these settings may lead to increased power consumption, which in turn can have a negative impact on battery life and/or the user experience.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
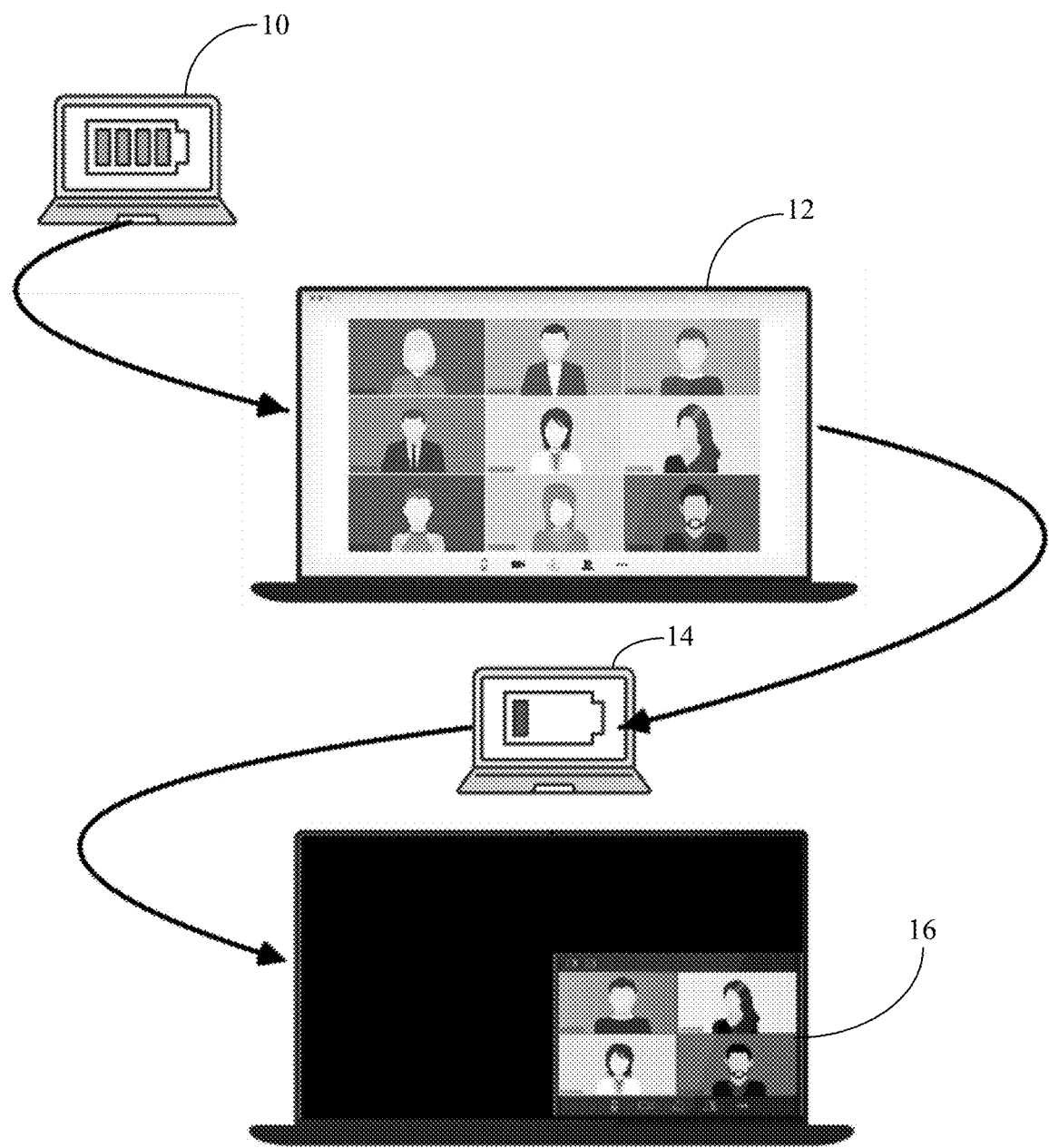
FIG. 1 is an illustration of an example of an active display size reduction according to an embodiment.

Inbuilt (e.g., internal, embedded, native) displays integrated with laptops and other portable devices are ever increasing in capabilities that—although they provide enhanced features—also consume a substantial amount of power when active (e.g., 4000/4K resolution (e.g., 3840 pixels×2160 pixels), large screen size, high refresh rate gaming displays, HDR/high dynamic range, etc.). These internal displays can be configured using various procedures including, but not limited to, built-in EDID (extended display identification) data transmitted by the display to an OS (operating system) kernel, which configures graphics drivers accordingly. The technology described herein modifies the EDID and/or display capabilities to achieve reduced power consumption.

More particularly, internal displays that are present in mobile devices are configured using built-in EDID data issued by the display. The EDID data is read, parsed and interpreted by an OS kernel and the graphics drivers are configured accordingly. One of the parameters is the physically addressable/active display size, which remains static and is not re-configurable. The technology described herein provides a methodology to adjust the visible display panel size via EDID parameter modifications and additional changes that result in power savings from the display, memory bandwidth, system on chip (SoC) graphics technology (GT) and display engine (DE), and so forth.

The technology described herein identifies various display configurations and features existing on the attached display panel. These configurations and features can include display modes and frequencies, features such as variable refresh rate, HDR, partial screen refresh (PSR), split screen mode support (e.g., active screen sizes, if any), VESA (Video Electronic Standards Association) adaptive sync, ambient lighting based adaptive brightness control, and so forth.

Embodiments may further categorize the above identified features as being "function critical" or "enhancements". In one example, features/configurations identified as being related to power savings are saved to a lookup table (LUT) along with alternative configuration data to facilitate transitions of the internal display to lower power states.

When a feature enablement flag (e.g., SoC level BIOS/basic input output system monitoring flag per the display BOM/bill of materials) is set for power saving, various user defined triggers may be established such as low battery level (e.g., <20%), time to next charge (e.g., usage analysis/prediction), user option/setting (e.g., feature enablement flag is set), user presence (e.g., proximity sensor), power consumption (e.g., indicating display power as a significant power consumer), a battery powered condition (e.g., not connected to a charger), platform based power analysis applications (e.g., wakeup history condition indicating display power is a cause for SoC wakeups), and so forth. The pre-tabulated LUT can then be referenced and compared with the current display configuration to identify and select a more aggressive display configuration option to save power.

Turning now to FIG. 1, a sample case is active screen size reduction to achieve power savings during an ongoing video conference call. In the illustrated example, a mobile computing system has a relatively high battery charge level 10 at the start of a video conference call. Accordingly, the size of an active display 12 is permitted to be relatively large in a first state. During the video conference call, the mobile computing system drops to a relatively low battery charge level 14. The low battery charge level 14 triggers the mobile computing system to automatically reconfigure the size of the active display 16 to be relatively small. This reconfiguring could involve recomputing the various EDID parameters and conducting a soft OS/windowing (e.g., Wayland/Ozone, etc.) framework reconfiguration along with other display device related parameters that are used to configure the DE/GT and/or the display drivers. For example, the reconfiguration might involve lowering the physical/visible size of the display from X*Y display size to a lower dimension (X−Δ*Y−Δ), which reduces the power impact from the display (e.g., active light emitting diode (LED), input/output (I/O) memory bandwidth, SoC (GT/DE). Other reconfiguration adjustments can include vertical sync (Vsync) and horizontal sync (Hsync) clocking reductions, system agent (SA) clock reductions, package C-state increases (e.g., PC8→PC10 entries), watermark (e.g., screen security) timing reductions, and so forth.

Thus, the active screen size is reconfigured to save power during a low battery scenario while the video conference call is on-going (e.g., without conducting a system restart). The full display (4 k LED/organic LED (OLED): 3840×2160) display is reduced to a smaller resolution and screen size (1920×1080), while maintaining the aspect ratio. The user experience is therefore similar to shrinking the video conference call user interface (UI) from a laptop/notebook to a smaller portable device (e.g., tablet or phone form factor). This change could bring about a drop in bandwidth by 25% for a 30 fps (frames per second) refresh rate 4K display bandwidth alone: (3840*2160*30*3(red, green, blue/RGB-Bytes)=~712 MB/s, while the reduced active size to 1080p would be (1920*1080*30*3(RGB-Bytes)=~178 MB/s). This reduction in bandwidth along with the additional bandwidth from the use case running on a 4 k screen (e.g., video conferencing, video Playback, YOUTUBE, streaming, gaming, etc.) relative to a tablet screen can reduce the overall bandwidth considerably (e.g., making the selection of a lower frequency to support the bandwidth requirements).

Another example involves leveraging VESA adaptive sync standard support to dynamically switch the sync frequency (e.g., switching to a different refresh rate) for relatively static refresh rate applications such as video conferencing. The technology described herein can reduce the refresh rate dynamically based on bandwidth (B/W) and power usage. For example, dropping the refresh rate from a 60 fps (e.g., default display mode) to much lower power consuming 40 fps or 30 fps, results in no discernable impact for the use case. Indeed, an even lower resolution such as 24 fps may be used if the rate of changes in the display content is within permissible limits. Thus, keeping the resolution the same, the B/W for a 60 fps 4 k display would be ~1.4 GB/s, whereas the B/W for a 30 fps 4 k display would be ~712 MB/s.

The above examples provide the savings from the SoC, memory, clocking modules, etc. The display panel itself (LED/OLED) would also bring about considerable savings by the fact that 75% of the screen will only consume black level power for the reduced active screen size configuration. The benefits of the technology described herein include I/O bandwidth reduction, display engine scalar usage, reduced timer (e.g., as the Vsync clocking rates decrease, display watermark timing will be less aggressive, giving more opportunity to enter lower PC states with lesser timer wakes), display component power reduction (e.g., reduced active screen will reduce the on pixel rate, which in turn reduces display and platform power consumption).

Figure 2:
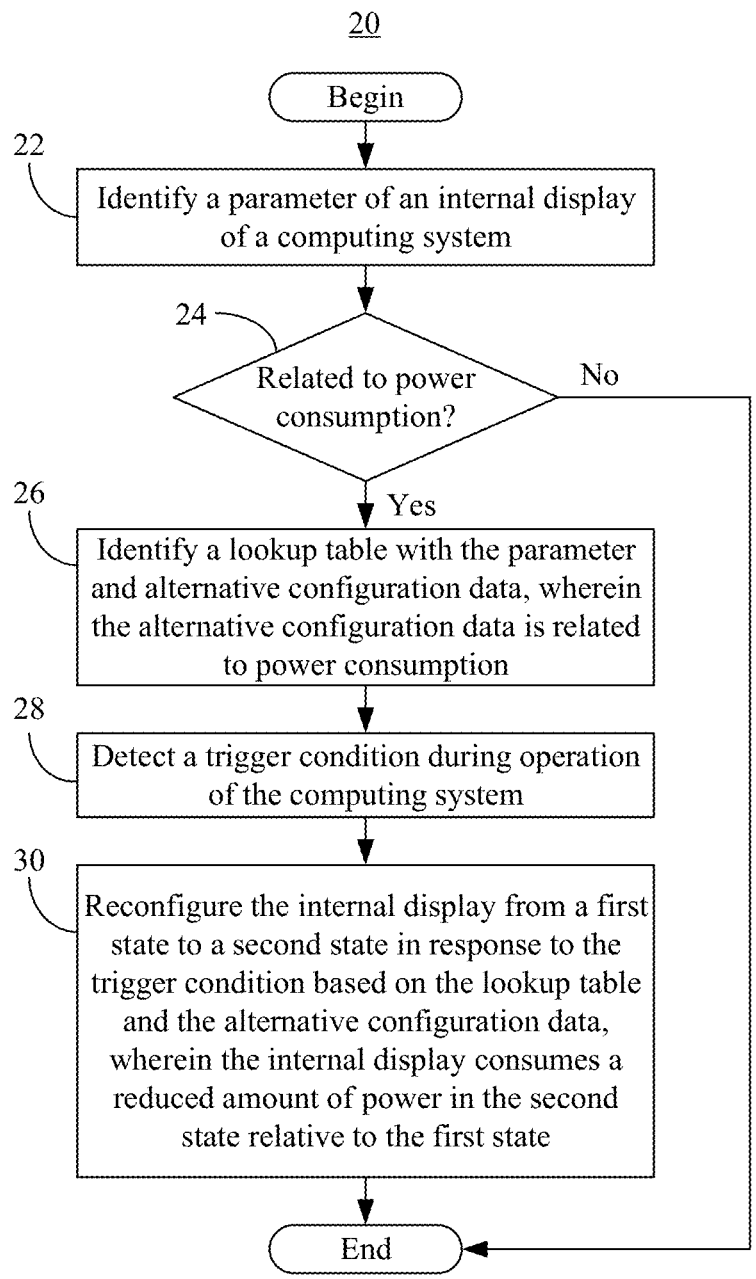
FIG. 2 is a flowchart of an example of a method of operating a performance-enhanced computing system according to an embodiment.

FIG. 2 shows a method 20 of operating a performance-enhanced computing system. The method 20 may be implemented in one or more modules as a set of logic instructions (e.g., executable program instructions) stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Computer program code to carry out operations shown in the method 20 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, micro-code, state-setting data, configuration data for integrated circuitry, state information that personalizes electronic circuitry and/or other structural components that are native to hardware (e.g., host processor, central processing unit/CPU, microcontroller, etc.).

Illustrated processing block 22 provides for identifying a parameter (e.g., active display size parameter, refresh rate parameter, HDR parameter, etc.) of an internal display of a computing system (e.g., mobile device). In one example, the parameter is a static parameter that does not change once the mobile device has powered up. Additionally, the parameter may be determined based on EDID data received from the internal display. A determination is made at block 24 as to whether the identified parameter is related to power consumption. If so, block 26 identifies a lookup table (LUT) with the parameter and alternative configuration data, wherein the alternative configuration data is related to power consumption. For example, if the parameter is an active display size parameter, the alternative configuration data might include a reduced screen area in terms of distance (e.g., millimeters/mm) and/or pixels, along with adjusted clocking, pixel pitch and/or Vsync blanking timing to support the reduced screen area.

Block 28 detects a trigger condition during operation of the computing system. For example, the trigger condition might include one or more of a low battery condition, a time to next charge prediction, a user setting, a user presence condition, a power in consumption condition, a battery powered condition or a wakeup history condition. Block 30 reconfigures the internal display from a first state to a second state in response to the trigger condition based on the lookup table and the alternative configuration data. In the illustrated example, the internal display consumes a reduced amount of power in the second state relative to the first state.

For example, when the parameter is an active display size parameter, the internal display includes a reduced active display size in the second state relative to the first state. Additionally, when the parameter is a refresh rate parameter, the internal display refreshes at a lower rate in the second state relative to the first state. Moreover, when the parameter is an HDR mode parameter, the internal display disables the HDR mode in the second state. Block 30 may also bypass a restart of the computing system during a transition of the internal display from the first state to the second state. Bypassing the restart can be particularly advantageous when an active application such as, for example, a video conferencing session, is ongoing. The method 20 therefore enhances performance at least to the extent that reconfiguring the internal display to consume less power extends battery life and/or improves the user experience (e.g., fewer power-related interruptions).

Figure 3:
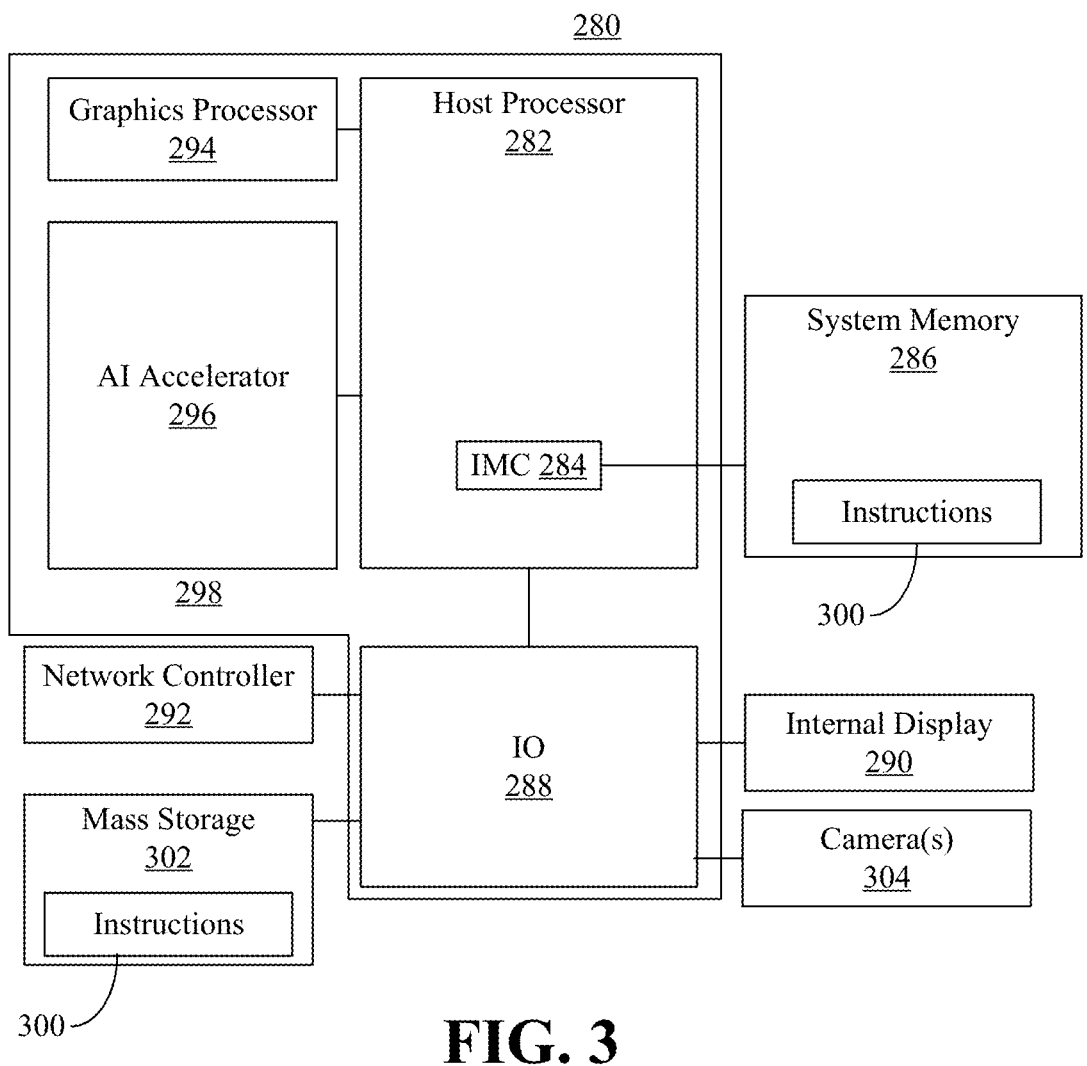
FIG. 3 is a block diagram of an example of a performance-enhanced computing system according to an embodiment.

Turning now to FIG. 3, a performance-enhanced computing system 280 is shown. The computing system 280 may generally be part of an electronic device/platform having computing functionality (e.g., personal digital assistant/PDA, notebook computer, tablet computer, convertible tablet, edge node, server, cloud computing infrastructure), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, drone functionality, etc., or any combination thereof.

In the illustrated example, the computing system 280 includes a host processor 282 (e.g., central processing unit/CPU) having an integrated memory controller (IMC) 284 that is coupled to a system memory 286 (e.g., dual inline memory module/DIMM including a plurality of DRAMs).

In an embodiment, an IO (input/output) module 288 is coupled to the host processor 282. The illustrated IO module 288 communicates with, for example, an internal display 290 (display subsystem, e.g., touch screen, liquid crystal displays/LCD, light emitting diode/LED display), mass storage 302 (e.g., hard disk drive/HDD, optical disc, solid state drive/SSD) and a network controller 292 (e.g., wired and/or wireless). The host processor 282 may be combined with the IO module 288, a graphics processor 294, and an artificial intelligence (AI) accelerator 296 (e.g., specialized processor) into a system on chip (SoC) 298. The computing system 280 may also include one or more cameras 304.

The SoC 298 retrieves executable program instructions 300 from the system memory 286 and/or the mass storage 302 and executes the instructions 300 to perform one or more aspects of the method 20 (FIG. 2), already discussed. In one example, an OS kernel running on the host processor 282 executes the instructions 300. Thus, execution of the instructions 300 by the SoC 298 causes the SoC 298 and/or the computing system 280 to identify a parameter of the internal display 290, populate a lookup table with the parameter and alternative configuration data, wherein the alternative configuration data is related to power consumption, detect a trigger condition during operation of the computing system, and reconfigure the internal display 290 from a first state to a second state in response to the trigger condition based on the lookup table and the alternative configuration data. As already noted, the internal display 290 consumes a reduced amount of power in the second state relative to the first state. The computing system 280 is therefore considered to be performance-enhanced at least to the extent that reconfiguring the internal display to consume less power extends battery life and/or improves the user experience (e.g., fewer power-related interruptions).

Figure 4:
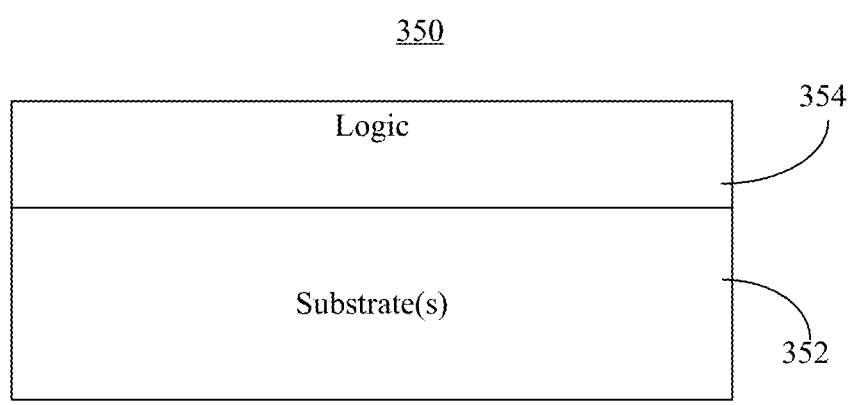
FIG. 4 is an illustration of an example of a semiconductor package apparatus according to an embodiment.

FIG. 4 shows a semiconductor apparatus 350 (e.g., chip, die, package). The illustrated apparatus 350 includes one or more substrates 352 (e.g., silicon, sapphire, gallium arsenide) and logic 354 (e.g., transistor array and other integrated circuit/IC components) coupled to the substrate(s) 352. In an embodiment, the logic 354 implements one or more aspects of the method 20 (FIG. 2), already discussed.

The logic 354 may be implemented at least partly in configurable or fixed-functionality hardware. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 5:
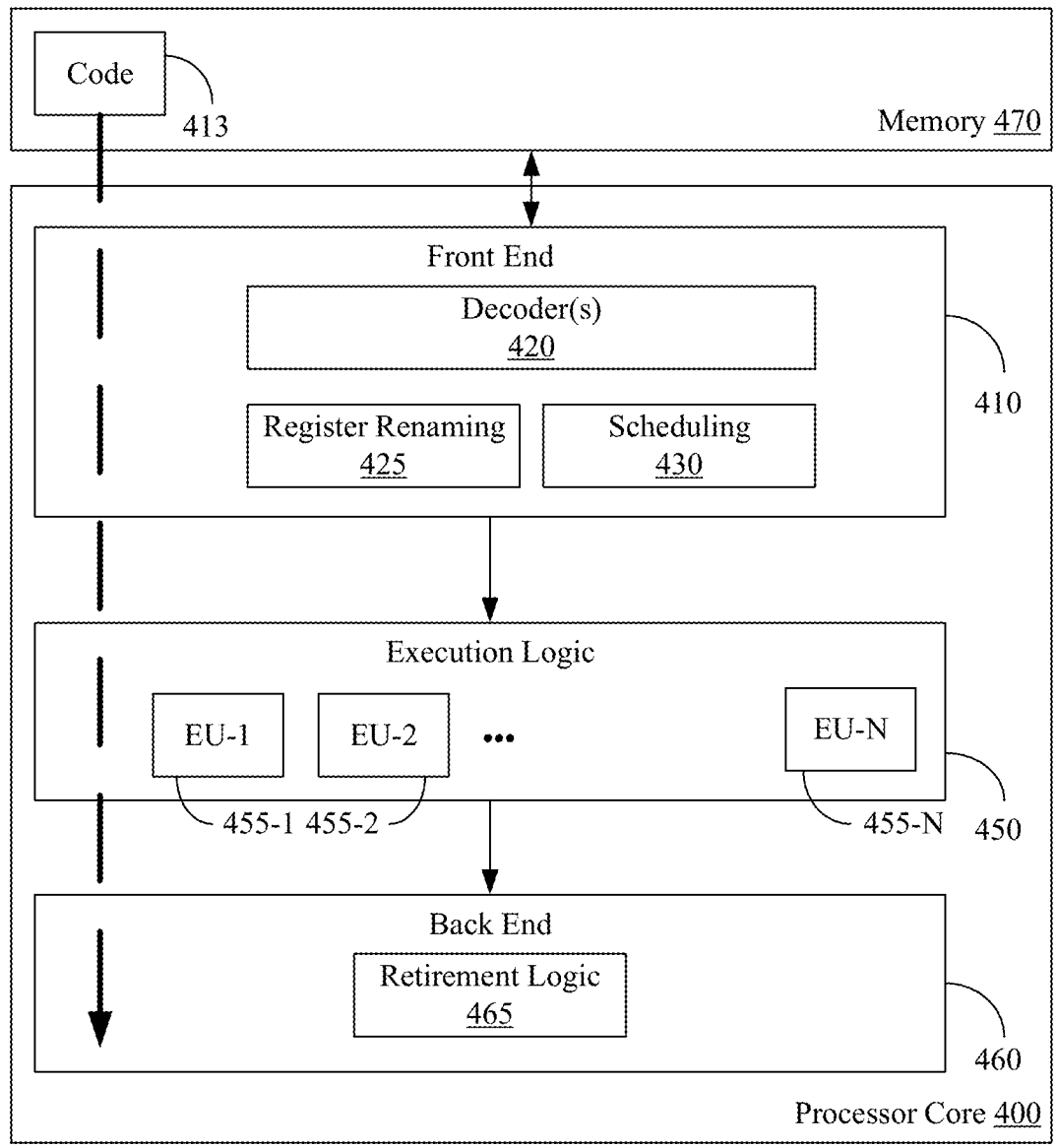
FIG. 5 is a block diagram of an example of a processor according to an embodiment.

FIG. 5 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 5, a processing element may alternatively include more than one of the processor core 400 illustrated in FIG. 5. The processor core 400 may be a single-threaded core or, for at least one embodiment, the processor core 400 may be multithreaded in that it may include more than one hardware thread context (or "logical processor") per core.

FIG. 5 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 20 (FIG. 2), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 450.

Although not illustrated in FIG. 5, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 6:
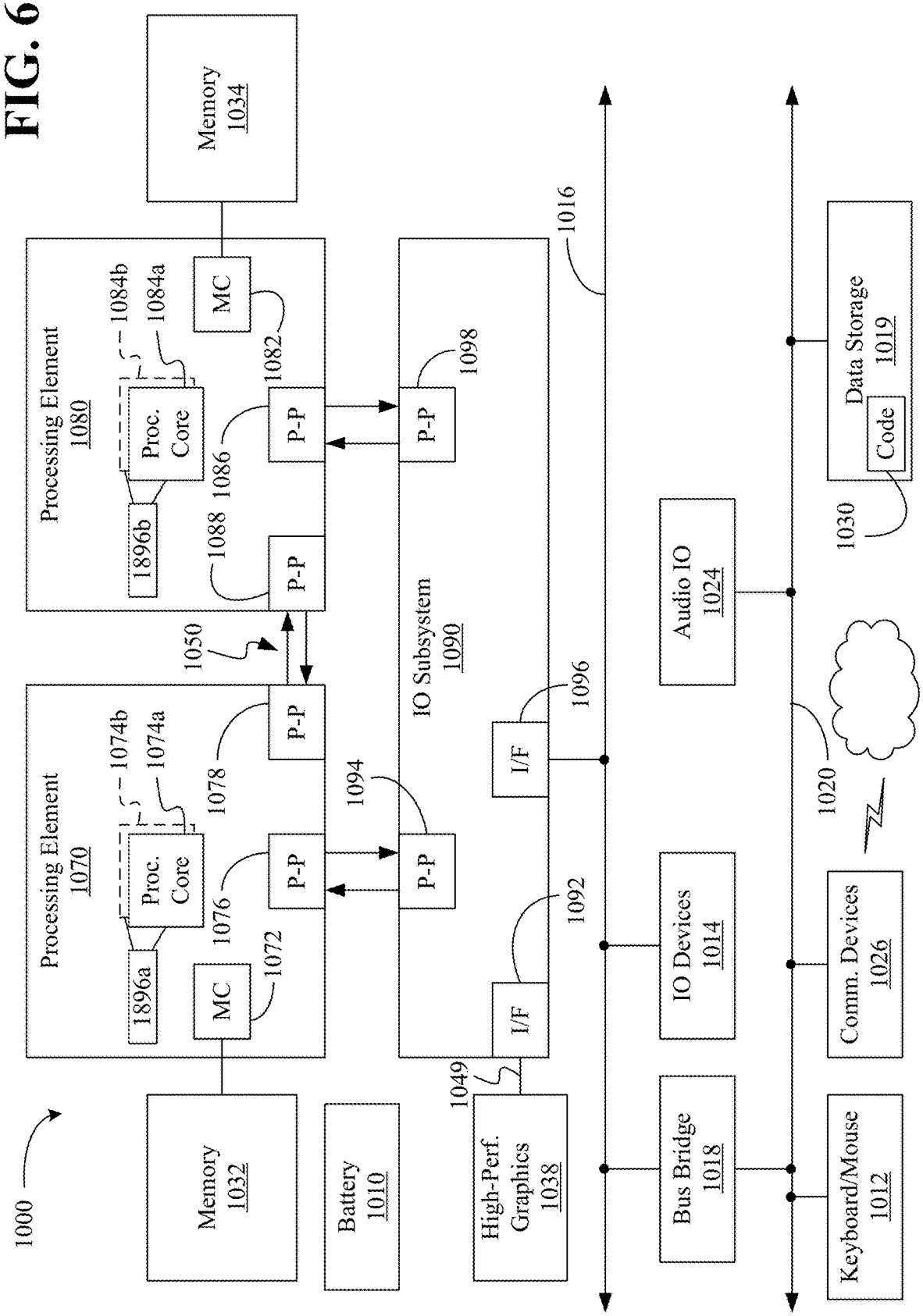
FIG. 6 is a block diagram of an example of a multi-processor based computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIG. 2), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Example 1 includes a performance-enhanced computing system comprising an internal display, a processor coupled to the internal display, and a memory coupled to the processor, the memory including a set of instructions, which when executed by the processor, cause the processor to identify a parameter of the internal display, detect a trigger condition during operation of the computing system, and reconfigure the internal display from a first state to a second state in response to the trigger condition based on the lookup table and alternative configuration data, wherein the internal display is to consume a reduced amount of power in the second state relative to the first state.

Example 2 includes the computing system of Example 1, wherein the set of instructions, when executed, further cause the processor to identify a lookup table with the parameter and the alternative configuration data, wherein the parameter is related to power consumption, and wherein the parameter is a static parameter.

Example 3 includes the computing system of any one of Examples 1 to 2, wherein the parameter is an active display size parameter, and wherein the internal display is to include a reduced active display size in the second state relative to the first state.

Example 4 includes the computing system of any one of Examples 1 to 3, wherein the parameter is a refresh rate parameter, and wherein the internal display is to refresh at a lower rate in the second state relative to the first state.

Example 5 includes the computing system of any one of Examples 1 to 3, wherein the parameter is a high dynamic range mode parameter, and wherein the internal display is to disable a high dynamic range mode in the second state.

Example 6 includes at least one computer readable storage medium comprising a set of instructions, which when executed by a computing system, cause the computing system to identify a parameter of an internal display of a computing system, detect a trigger condition during operation of the computing system, and reconfigure the internal display from a first state to a second state in response to the trigger condition based on the lookup table and alternative configuration data, wherein the internal display is to consume a reduced amount of power in the second state relative to the first state.

Example 7 includes the at least one computer readable storage medium of Example 6, wherein the set of instructions, when executed, further cause the computing system to identify a lookup table with the parameter and the alternative configuration data, wherein the alternative configuration data is related to power consumption, and wherein the parameter is a static parameter.

Example 8 includes the at least one computer readable storage medium of Example 6, wherein the parameter is an active display size parameter, and wherein the internal display is to include a reduced active display size in the second state relative to the first state.

Example 9 includes the at least one computer readable storage medium of Example 6, wherein the parameter is a refresh rate parameter, and wherein the internal display is to refresh at a lower rate in the second state relative to the first state.

Example 10 includes the at least one computer readable storage medium of Example 6, wherein the parameter is a high dynamic range mode parameter, and wherein the internal display is to disable a high dynamic range mode in the second state.

Example 11 includes the at least one computer readable storage medium of Example 6, wherein the computing system is to bypass a restart during a transition of the internal display from the first state to the second state.

Example 12 includes the at least one computer readable storage medium of any one of Examples 6 to 11, wherein the trigger condition includes one or more of a low battery condition, a time to next charge prediction, a user setting, a user presence condition, a power consumption condition, a battery powered condition or a wakeup history condition.

Example 13 includes a semiconductor apparatus comprising one or more substrates, and logic coupled to the one or more substrates, wherein the logic is implemented at least partly in one or more of configurable or fixed-functionality hardware, the logic to identify a parameter of an internal display of a computing system, detect a trigger condition during operation of the computing system, and reconfigure the internal display from a first state to a second state in response to the trigger condition based on the lookup table and alternative configuration data, wherein the internal display is to consume a reduced amount of power in the second state relative to the first state.

Example 14 includes the semiconductor apparatus of Example 13, wherein the logic is to identify a lookup table with the parameter and the alternative configuration data, wherein the alternative configuration data is related to power consumption, and wherein the parameter is a static parameter.

Example 15 includes the semiconductor apparatus of Example 13, wherein the parameter is an active display size parameter, and wherein the internal display is to include a reduced active display size in the second state relative to the first state.

Example 16 includes the semiconductor apparatus of Example 13, wherein the parameter is a refresh rate parameter, and wherein the internal display is to refresh at a lower rate in the second state relative to the first state.

Example 17 includes the semiconductor apparatus of Example 13, wherein the parameter is a high dynamic range mode parameter, and wherein the internal display is to disable a high dynamic range mode in the second state.

Example 18 includes the semiconductor apparatus of Example 13, wherein the computing system is to bypass a restart during a transition of the internal display from the first state to the second state.

Example 19 includes the semiconductor apparatus of any one of Examples 13 to 18, wherein the trigger condition includes one or more of a low battery condition, a time to next charge prediction, a user setting, a user presence condition, a power consumption condition, a battery powered condition or a wakeup history condition.

Example 20 includes the semiconductor apparatus of any one of Examples 13 to 19, wherein the logic coupled to the one or more substrates includes transistor channel regions that are positioned within the one or more substrates.

Example 21 includes a method of operating a performance-enhanced computing system, the method comprising identifying a parameter of an internal display of a computing system, populating a lookup table with the parameter and alternative configuration data, wherein the alternative configuration data is related to power consumption, detecting a trigger condition during operation of the computing system, and reconfiguring the internal display from a first state to a second state in response to the trigger condition based on the lookup table and the alternative configuration data, wherein the internal display is to consume a reduced amount of power in the second state relative to the first state.

Example 22 includes an apparatus comprising means for performing the method of Example 21.

The technology described herein therein therefore provides power savings via display reconfigurations, system agent (SA) clock reduction via memory bandwidth savings, display power saving opportunities, SoC (CPU, GT and DE) power savings with lower IO interrupts for the display engine, more tolerant display watermark timers, etc.

Embodiments may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   an internal display;
   a processor coupled to the internal display; and
   a memory coupled to the processor, the memory including a set of instructions, which when executed by the processor, cause the processor to:
      identify a parameter of the internal display,
      detect a trigger condition during operation of the computing system, and
      reconfigure the internal display from a first state to a second state in response to the trigger condition based on the lookup table and alternative configuration data, wherein the internal display is to consume a reduced amount of power in the second state relative to the first state.

2. The computing system of claim 1, wherein the set of instructions, when executed, further cause the processor to identify a lookup table with the parameter and the alternative configuration data, wherein the alternative configuration data is related to power consumption, and wherein the parameter is a static parameter.

3. The computing system of claim 1, wherein the parameter is an active display size parameter, and wherein the internal display is to include a reduced active display size in the second state relative to the first state.

4. The computing system of claim 1, wherein the parameter is a refresh rate parameter, and wherein the internal display is to refresh at a lower rate in the second state relative to the first state.

5. The computing system of claim 1, wherein the parameter is a high dynamic range mode parameter, and wherein the internal display is to disable a high dynamic range mode in the second state.

6. At least one non-transitory computer readable storage medium comprising a set of instructions, which when executed by a computing system, cause the computing system to:
   identify a parameter of an internal display of a computing system;
   detect a trigger condition during operation of the computing system; and
   reconfigure the internal display from a first state to a second state in response to the trigger condition based on the lookup table and alternative configuration data, wherein the internal display is to consume a reduced amount of power in the second state relative to the first state.

7. The at least one non-transitory computer readable storage medium of claim 6, wherein the set of instructions, when executed, further cause the computing system to identify a lookup table with the parameter and the alternative configuration data, wherein the alternative configuration data is related to power consumption, and wherein the parameter is a static parameter.

8. The at least one non-transitory computer readable storage medium of claim 6, wherein the parameter is an active display size parameter, and wherein the internal display is to include a reduced active display size in the second state relative to the first state.

9. The at least one non-transitory computer readable storage medium of claim 6, wherein the parameter is a refresh rate parameter, and wherein the internal display is to refresh at a lower rate in the second state relative to the first state.

10. The at least one non-transitory computer readable storage medium of claim 6, wherein the parameter is a high dynamic range mode parameter, and wherein the internal display is to disable a high dynamic range mode in the second state.

11. The at least one non-transitory computer readable storage medium of claim 6, wherein the computing system is to bypass a restart during a transition of the internal display from the first state to the second state.

12. The at least one non-transitory computer readable storage medium of claim 6, wherein the trigger condition includes one or more of a low battery condition, a time to next charge prediction, a user setting, a user presence condition, a power consumption condition, a battery powered condition or a wakeup history condition.

13. A semiconductor apparatus comprising:
    one or more substrates; and
    logic coupled to the one or more substrates, wherein the logic is implemented at least partly in one or more of configurable or fixed-functionality hardware, the logic to:
       identify a parameter of an internal display of a computing system;
       detect a trigger condition during operation of the computing system; and
       reconfigure the internal display from a first state to a second state in response to the trigger condition based on the lookup table and alternative configuration data, wherein the internal display is to consume a reduced amount of power in the second state relative to the first state.

14. The semiconductor apparatus of claim 13, wherein the logic is to identify a lookup table with the parameter and the alternative configuration data, wherein the alternative configuration data is related to power consumption, and wherein the parameter is a static parameter.

15. The semiconductor apparatus of claim 13, wherein the parameter is an active display size parameter, and wherein the internal display is to include a reduced active display size in the second state relative to the first state.

16. The semiconductor apparatus of claim 13, wherein the parameter is a refresh rate parameter, and wherein the internal display is to refresh at a lower rate in the second state relative to the first state.

17. The semiconductor apparatus of claim 13, wherein the parameter is a high dynamic range mode parameter, and wherein the internal display is to disable a high dynamic range mode in the second state.

18. The semiconductor apparatus of claim 13, wherein the computing system is to bypass a restart during a transition of the internal display from the first state to the second state.

19. The semiconductor apparatus of claim 13, wherein the trigger condition includes one or more of a low battery condition, a time to next charge prediction, a user setting, a user presence condition, a power consumption condition, a battery powered condition or a wakeup history condition.

20. The semiconductor apparatus of claim 13, wherein the logic coupled to the one or more substrates includes transistor channel regions that are positioned within the one or more substrates.

* * * * *